Aug. 22, 1939.   J. SCHAEFER   2,170,352
WHEEL OR PULLEY LOCK
Filed May 19, 1937
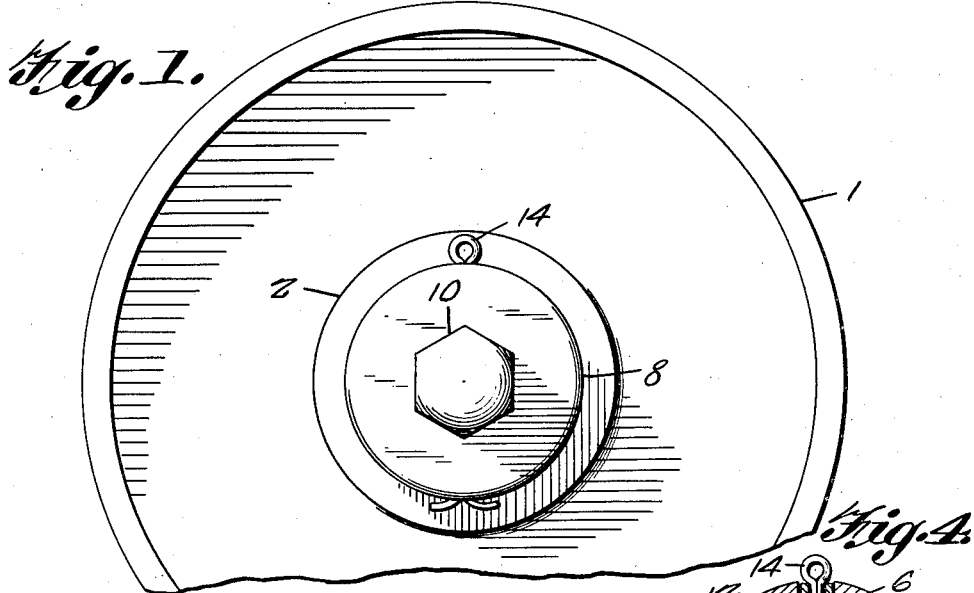
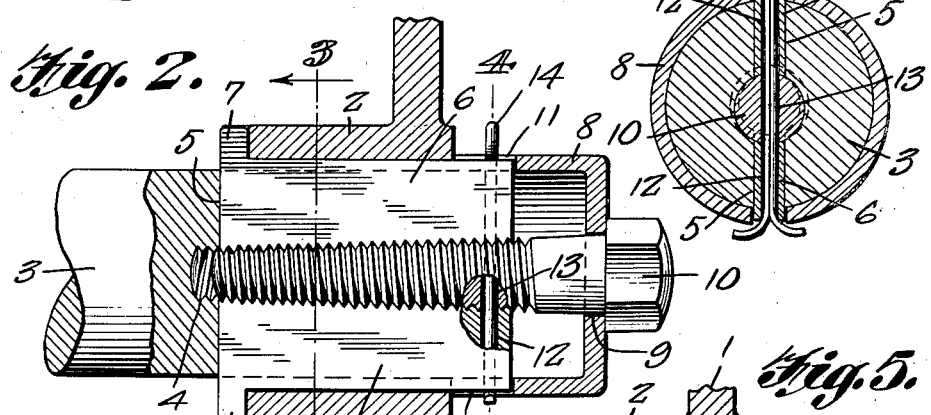
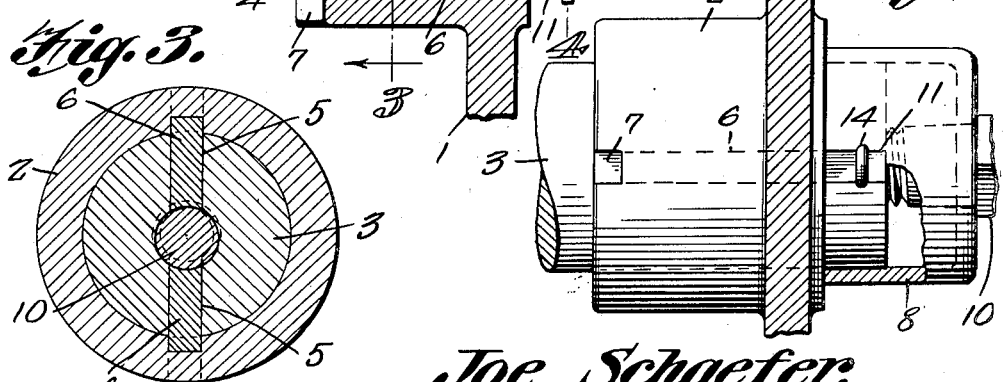
Joe Schaefer, INVENTOR
BY Victor J. Evans & Co.
ATTORNEYS Patented Aug. 22, 1939

2,170,352

UNITED STATES PATENT OFFICE 2,170,352

WHEEL OR PULLEY LOCK

Joe Schaefer, Pinckneyville, Ill.

Application May 19, 1937, Serial No. 143,577

2 Claims. (Cl. 287—53)

This invention relates to wheel or pulley locks and has for the primary object the provision of a device of this character which will efficiently key a wheel or pulley on a shaft and prevent endwise movement thereof on said shaft and will eliminate the possibility of the wheel or pulley accidentally becoming detached from the shaft.

With these and other objects in view, this invention consists in certain novel features of construction, combination and arrangement of parts to be hereinafter more fully described and claimed.

For a complete understanding of my invention, reference is to be had to the following description and accompanying drawing, in which Figure 1 is a fragmentary side elevation illustrating a pulley secured on a shaft by a lock constructed in accordance with my invention.

Figure 2 is a fragmentary vertical sectional view showing the lock secured fully on the shaft.

Figure 3 is a transverse sectional view taken on the line 3—3 of Figure 2.

Figure 4 is a transverse sectional view taken on the line 4—4 of Figure 2.

Figure 5 is a fragmentary horizontal sectional view showing the lock secured fully on the shaft.

Referring in detail to the drawing, the numeral 1 indicates a pulley having arranged in the hub 2 thereof oppositely disposed keyways. The hub 2 receives a shaft 3 in which is formed a screw threaded bore 4 and oppositely disposed key slots 5. The key slots open outwardly through opposite faces of the shaft and also communicate with the screw threaded bore to receive keys 6, the opposing edges of which are screw threaded to match the screw threads of the screw threaded bore. Shoulders 7 are formed on the keys to abut one end of the hub 2. Engaging the opposite end of the hub 2 is a cap 8 having a centrally arranged opening 9 to permit a stud bolt 10 to extend therethrough and thread into the socket 4. The stud bolt 10 is tapered and the threads thereof also mesh with the threads of the keys forcing said keys into the keyways of the hub. The head of the bolt engages the cap and holds the latter on the hub. The cap has slots 11 to receive the keys. The cap bearing against the outer ends of the keys forces the inner ends of said keys against the inner end walls of the keyways. The keys have openings 12 therethrough which align with an opening 13 in the bolt 10. A cotter key 14 is passed through the slots 11 in the cap, openings 12 and 13 consequently locking the bolt against rotation and thereby preventing the hub from becoming accidentally disconnected from the shaft. The keys 6 secure the hub against endwise movement on the shaft and also secure the hub 2 or pulley for rotation with the shaft.

What is claimed is:

1. In combination with a pulley having a hub formed with oppositely disposed keyways in the wall of the bore thereof and terminating at one end of said hub in outwardly extending recesses, a shaft extending through said hub and formed with a transversely extending key slot registering with said keyways and provided with an end wall in alignment with said mentioned end of said hub, said shaft formed with an axially extending threaded bore bisecting said key slot, a pair of oppositely disposed keys positioned in said bi-sected slot and having edge portions extending into said keyways, one end of said keys abutting said end wall and fashioned with lugs extending within said recesses, a stud bolt threaded in said bore and threadedly engaging said keys in said key slot, and a cap carried by said bolt and formed with a skirt having slots receiving ends of said keys and engaging the opposite end of said hub for coaction with said lugs to maintain said hub against axial movement on said shaft.

2. In combination with a pulley having a hub formed with oppositely disposed keyways in the wall of the bore thereof and terminating at one end of said hub in outwardly extending recesses, a shaft extending through said hub and formed with a transversely extending key slot registering with said keyways and provided with an end wall in alignment with said mentioned end of said hub, said shaft formed with an axially extending threaded bore bisecting said key slot, a pair of oppositely disposed keys positioned in said bisected slot and having edge portions extending into said keyways, one end of said keys abutting said end wall and fashioned with lugs extending within said recesses, a stud bolt threaded in said bore and threadedly engaging said keys in said key slot, a cap carried by said bolt and formed with a skirt having slots receiving ends of said keys and engaging the opposite end of said hub for coaction with said lugs to maintain said hub against axial movement on said shaft, and a pin extending through said keys and stud bolt for maintaining said stud bolt locked to said shaft.

JOE SCHAEFER.